Nov. 20, 1956     P. C. CONSOLETTI     2,771,100
SHUTTLE
Filed June 11, 1953
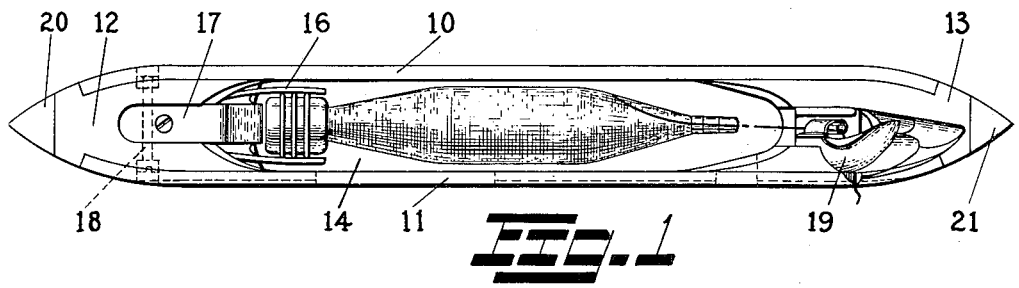
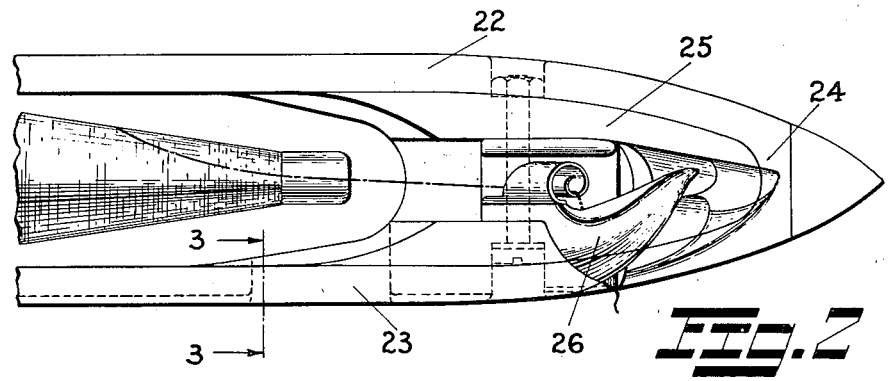
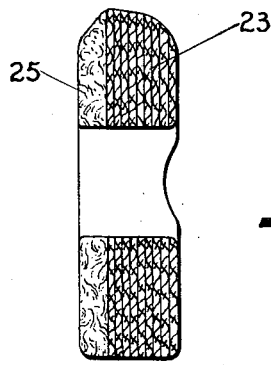
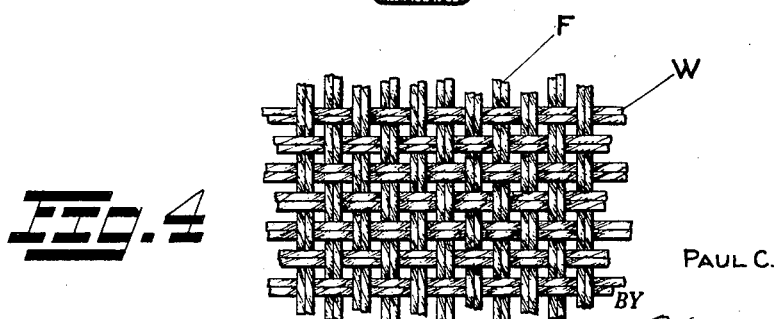
INVENTOR.
PAUL C. CONSOLETTI
BY
*Rodney C. Southworth*
ATTORNEY

United States Patent Office 2,771,100
Patented Nov. 20, 1956

2,771,100

SHUTTLE

Paul C. Consoletti, Milford, Mass., assignor to Draper Corporation, Hopedale, Mass., a corporation of Maine Application June 11, 1953, Serial No. 361,028

2 Claims. (Cl. 139—196)

This invention pertains to loom shuttles, for example, shuttles molded from plastic material in which reinforcing elements are incorporated.

It is an object of the invention to produce a shuttle of increased strength, resilience, resistance to abrasion, rigidity, and to improve the friction characteristics between the shuttle and those elements on which it moves when in use.

Loom shuttles have been made of wood in the main, but of late several attempts have been directed toward a shuttle of molded plastic material, practically all logical molding compounds and many systems for reinforcing having been tried. Many of these have shown promise, but the resulting combination of strength, rigidity, resilience and operational and wearing qualities has always left something to be desired. Some products have been of a rubbery nature resistant to shocks, but very much inclined to heat when operated and in so doing, they develop an inordinate amount of friction. In some the wearing and frictional characteristics are good, but brittleness or lack of strength tend to cause premature failure.

A number of synthetic resins such as the phenolic resins do serve fairly well when reinforced. It has been found that the reinforcing material as well as the arrangement thereof are very important. Reinforcing media may be incorporated by interspersing flocculent, shredded or chopped material in the molding compound or by arranging coated sheet or strip stock in a predetermined way. The former system results in a macerate while the latter is employed to obtain a laminate. Each has its own particular use in plastic shuttle work.

A loom shuttle is relatively weak at the side members, these necessarily being of thin section and also suffering loss of possible strength due to loom design and operation which require openings at the front side or wall for the purpose of permitting entry of a thread cutter and of the usual filling feeler tip. These reduced sections require a very strong, resilient and tough material to stand the repeated shocks to which the shuttle is subjected in use. For best performance the material, especially that of which the side members are formed should have great resistance to abrasion and should present a low friction coefficient when operated to and fro on the lay and reed of the loom.

According to the invention the best results are achieved by molding a shuttle substantially to its final form and preferably with the spurs incorporated during the molding process, and when forming the side walls or members of laminated construction and each of the end portions as a macerate body. These end and side members, while referred to as individual or separate parts are not detached or detachable in any sense but all are molded and bonded into an integral whole so that there is only an imaginary division between the said macerated and laminated parts. The filling of the mold after placing the reinforcing laminations involves injecting under pressure the macerate material which flows into that part of the mold cavity which is not occupied by the uncured laminate material.

It has been found that the desired strength and wear characteristics may be greatly enhanced by the use of a novel laminate base. Fabric is preferably utilized as such but applicant believes that he is the first to discover the fact that a proper combination of yarns of synthetic resins and of cotton lend to the finished product a much greater strength, elasticity, resistance to abrasion and resilience along with increased wear and lower total friction during operation.

The invention will be described in greater detail in the following disclosure in which reference is made to the accompanying figures of drawing in which:

Fig. 1 is a plan view of a shuttle to which the invention has been applied.

Fig. 2 is a view similar to Fig. 1, but enlarged and confined to one end of the shuttle, showing a modification.

Fig. 3 is a section at line 3—3, Fig. 2.

Fig. 4 is a detail view of a fabric as employed for a reinforcing lamina.

Now referring to Fig. 1, a shuttle body comprises side members or walls 10 and 11 and end members 12 and 13, the interior surfaces of which define a bobbin cavity 14. A bobbin 15 is held in the usual manner in a spring clip 16 seated in a suitable aperture in the end member 12 and held in place by a cover 17 and bolt 18. A threading block or eye 19 is likewise secured in end 13. Spurs 20 and 21 are molded into the end members in known manner.

According to this form of the invention, the end members are of a mixture of chopped rags, flocculent material, short lengths of waste yarn fibers or the like bonded by a synthetic resin such as one of the phenolic resins.

The side members are of laminations of fabric in tape or sheet form, bonded by a similar synthetic resin. For example, the fabric laminations may be cut from coated fabric as hereinafter described. The fabric is first coated with a "varnish" of the proper resin such as a phenolic resin and then cut and placed in the mold. The injected macerate fills the remainder of the cavity. The laminations are compressed as required before insertion in the mold, but are not cured. After the macerate has been injected, the entire casting is cured in a known way, the laminations thereby being bonded together and the macerate ends being simultaneously bonded to the side members.

In the figure the line of juncture between the side walls and end members is delineated as a definite plane, but, of course, that is only imaginary since the materials become effectively bonded into a unit in which there is no definite and discernible plane of cleavage.

The shuttle of Fig. 2 is similar in all respects except for the fact that the side member laminations are wound about a mandrel to form an elongated loop and are then compressed. That means that the laminate portion of the shuttle passes about each end and encompasses the macerate end members. Here the sides 22 and 23 and end section 24 enclose end member 25 in both of which is fixed the eye 26.

A section taken at line 3—3, Fig. 2 (also applying to the same part of Fig. 1), shows the laminations compacted by pressure and bonded by the synthetic resin when cured. This Fig. 3 also illustrates the reduced section resulting from the cutter slot.

According to the invention reinforcing fabric for the lamina is made from yarns of synthetic resins and cottons. The synthetic resins may include polyamide resins or nylons, polymerized acrylonitrile filaments sold under the trade name of Orlon or other similar filament yarns or yarns embodying at least some staple fibers of these materials. Essentially, the type of synthetic resin yarns preferred are those giving a high tensile strength, elasticity, resilience and resistance to abrasion. The nylons embody these to a marked degree, but others of similar nature may be substituted.

A fabric such as that of Fig. 4, woven with a nylon warp W with cotton filling F may be cut so the warp extends lengthwise of the side members and the required number of strips united to form a laminated side member.

Again, such a fabric may be woven from yarns some, at least, of which are from a blend of nylon and cotton. Preferably the amount of cotton in relation to nylon or other yarn of synthetic resin is in the nature of 50% by weight, however, the percentages may vary, it being understood that the latter are increased to extend the strength and resistance to structural failure while the cotton is increased to improve frictional characteristics and wearing qualities.

Briefly, the fabric may be formed by weaving or in any other convenient way, the basket weave herein illustrated being only one used with success. The incorporation of the two types of yarn may be effected in any manner such that the required strength and wearing qualities are realized in a degree to impart those attributes to the resulting product. It may be found advantageous to alternate some layers so a few have the stronger yarn running transversely or at least on a bias to the shuttle length.

It may be more advantageous to develop strength by placing lamina largely made from the yarns of synthetic resins at the center layers of the side members and to use lamina having a very substantial percentage of cotton at the outer layers, that is, those where frictional contact with the reed and the shuttle boxes is made. In any event it is more desirable to dispose the yarns predominantly of synthetic resins lengthwise of the shuttle. The disposal of the yarns of cotton is not so important. In case of a 50% resin and cotton warp and weft, then it makes no difference.

While one embodiment of the invention has been disclosed, it is to be understood that the inventive concept may be carried out in a number of ways. This invention is, therefore, not to be limited to the precise details described, but is intended to embrace all variations and modifications thereof falling within the spirit of the invention and the scope of the claims.

I claim:

1. A shuttle for looms having side and end members bonded into a unitary structure defining a bobbin cavity in which the said side members are formed as a laminate and the end members are a macerate type of molded plastic material, said side members comprising reinforcing lamina bonded by a phenolic resin, said lamina comprising a fabric in which components extending in the direction of the length of the shuttle are predominantly of a synthetic resin such as nylon and those components directed transversely to those first mentioned are predominantly of cotton.

2. A shuttle for looms having side and end members bonded into a unitary structure defining a bobbin cavity in which the said side members are formed as a laminate and the end members are a macerate type of molded plastic material, said side members comprising reinforcing lamina bonded by a phenolic resin, said lamina comprising a fabric in which components extending in the direction of the length of the shuttle are of a synthetic resin such as nylon and those components directed transversely to those first mentioned are of cotton.

References Cited in the file of this patent

UNITED STATES PATENTS

| 1,805,090 | Hills | May 12, 1931 |
| 1,861,593 | Christoph | June 7, 1932 |
| 2,371,032 | Davis | Mar. 6, 1945 |
| 2,385,718 | Menking | Sept. 25, 1945 |
| 2,444,903 | Van Buren | July 6, 1948 |

FOREIGN PATENTS

| 307,032 | Great Britain | Sept. 12, 1929 |